(12) United States Patent
Ghannam et al.

(10) Patent No.: US 9,676,356 B2
(45) Date of Patent: Jun. 13, 2017

(54) SYSTEM AND METHOD FOR SEATBELT USE MONITORING

(71) Applicant: FORD GLOBAL TECHNOLOGIES, LLC, Dearborn, MI (US)

(72) Inventors: Mahmoud Yousef Ghannam, Canton, MI (US); Abraham G. Phillip, Rochester Hills, MI (US); Kam Hage, Troy, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 515 days.

(21) Appl. No.: 14/202,060

(22) Filed: Mar. 10, 2014

(65) Prior Publication Data

US 2015/0251618 A1     Sep. 10, 2015

(51) Int. Cl.
| | | |
|---|---|---|
| B60R 21/015 | (2006.01) | |
| B60R 22/48 | (2006.01) | |
| B60K 28/02 | (2006.01) | |
| B60K 28/00 | (2006.01) | |

(52) U.S. Cl.
CPC ........ B60R 21/01544 (2014.10); B60K 28/02 (2013.01); B60R 22/48 (2013.01); *B60K 2028/003* (2013.01); *B60R 2022/485* (2013.01); *B60R 2022/4808* (2013.01); *B60R 2022/4816* (2013.01); *B60R 2022/4825* (2013.01)

(58) Field of Classification Search
CPC .............. B60K 2028/003; B60K 28/02; B60R 2022/4808; B60R 2022/4816; B60R 2022/4825; B60R 2022/485; B60R 21/01544; B60R 22/48; B60R 2022/4858; B60R 21/01548
See application file for complete search history.

(56) References Cited

U.S. PATENT DOCUMENTS

| | | | | |
|---|---|---|---|---|
| 5,454,591 A | * | 10/1995 | Mazur .................. | B60N 2/2806 180/273 |
| 5,626,359 A | * | 5/1997 | Steffens, Jr. .......... | B60R 21/013 180/268 |
| 5,670,853 A | * | 9/1997 | Bauer .................... | B60N 2/002 180/273 |
| 5,877,707 A | | 3/1999 | Kowalick | |
| 5,906,393 A | * | 5/1999 | Mazur ................ | G01G 19/4142 180/268 |
| 6,203,059 B1 | * | 3/2001 | Mazur .................... | B60R 22/48 280/735 |
| 6,282,473 B1 | * | 8/2001 | Steffens, Jr. ...... | B60R 21/01546 180/272 |

(Continued)

FOREIGN PATENT DOCUMENTS

DE           4447960        9/2007

*Primary Examiner* — Firmin Backer
*Assistant Examiner* — Nay Tun
(74) *Attorney, Agent, or Firm* — Frank MacKenzie; Price Heneveld LLP

(57) ABSTRACT

A monitoring system for a vehicle having a seat and a restraint with seatbelt webbing includes a webbing length sensor coupled with the restraint, a position sensor, and a processor. The processor is in communication with the webbing length sensor and the position sensor and is programmed to output a signal based on a determination that an extended webbing length is outside an acceptable range of webbing length for an occupant size category assigned using the position sensor.

20 Claims, 6 Drawing Sheets

(56) References Cited

U.S. PATENT DOCUMENTS

| | | | |
|---|---|---|---|
| 6,439,333 B2* | 8/2002 | Domens | B60R 21/33 |
| | | | 180/268 |
| 6,684,972 B2* | 2/2004 | Oyaski | B60K 28/063 |
| | | | 180/268 |
| 7,271,712 B2* | 9/2007 | Rubel | B60R 22/48 |
| | | | 180/268 |
| 2006/0000657 A1* | 1/2006 | Gray | B60R 21/01546 |
| | | | 180/286 |
| 2009/0020997 A1* | 1/2009 | Odate | B60R 22/46 |
| | | | 280/801.1 |
| 2009/0210115 A1* | 8/2009 | Gombert | B60R 22/44 |
| | | | 701/45 |
| 2012/0018989 A1 | 1/2012 | Breed | |
| 2013/0085629 A1* | 4/2013 | Washington | B64C 13/18 |
| | | | 701/15 |

* cited by examiner

SYSTEM AND METHOD FOR SEATBELT USE MONITORING

FIELD OF THE INVENTION

The present invention generally relates to a monitoring system useable in a motor vehicle to encourage or require proper seatbelt use by an occupant. The system is also capable of providing data to other safety systems within the vehicle.

BACKGROUND OF THE INVENTION

Motor vehicles, such as cars, trucks, SUVs, CUVs, and vans, for example, include restraints in the form of various types and styles of seatbelts, which are intended to be worn by an occupant of each of the seats of the vehicle. In general seatbelts are designed to help secure the occupant in position within a respective seat in the event of an accident or other abrupt movement of the vehicle. Many seatbelts require manual buckling by the occupant to function. In other words, it is up to the occupants of the seats of the vehicle to wear their seatbelts in order for the seatbelt to be effective for its intended purpose.

Many motor vehicles with seatbelts further include various systems or devices to monitor for and encourage use of seatbelts by occupants of the vehicle. Most prior forms of such monitoring systems include a switch or other sensor coupled with the seatbelt buckle that functions by telling the system whether or not the buckle insert is received within the buckle receptacle. An audible tone and/or a visible indication may be presented as long as the seatbelt remains unbuckled. Some prior systems further communicate with a weight sensor within the seats to allow the system to present such warnings only in the instance where an unbuckled seatbelt is associated with an occupied seat. However, such monitoring systems can be defeated by an occupant buckling the seatbelt prior to entering the vehicle and sitting on top of the buckled seatbelt.

Other monitoring systems have added the ability to monitor additional features of the seatbelt by additional means, including requiring that the seatbelt be withdrawn by a minimum threshold amount to disable indication messages or ignition/gear selector interlocks. However, such systems can still be defeated by drawing out an amount of an unused but buckled seatbelt or by other means. Accordingly further advances in seatbelt use monitoring systems are desired.

SUMMARY OF THE INVENTION

According to one aspect of the present invention a monitoring system for a vehicle having a seat and a restraint with seatbelt webbing includes a webbing length sensor coupled with the restraint, a position sensor, and a processor. The processor is in communication with the webbing length sensor and the position sensor and is programmed to output a signal based on a determination that an extended webbing length is outside an acceptable range of webbing length for an occupant size category assigned using the position sensor.

In an example, the processor can be programmed to determine a webbing position using the position sensor and assign the occupant size category based on a comparison of the determined webbing position and a set of the occupant size categories corresponding to predetermined webbing positions. The processor can further be programmed to assign a webbing length category based on a comparison of the extended webbing length and a set of webbing length categories corresponding to predetermined extended webbing lengths. The processor can, accordingly, determine whether the extended webbing length is outside the acceptable range of webbing length for the occupant size category by comparing the webbing length category and the occupant size category.

According to another aspect of the present invention, a vehicle, including a restraint having a seatbelt webbing, a first marker associated with the webbing, at least one adjustable safety device, and a position sensor. The vehicle further includes an occupant position monitor in communication with the position sensor and programmed to assign an occupant size category and determine an occupant position using information regarding a sensed position of the first marker. A control system is included in the vehicle, is in communication with the monitoring system, and is programmed to perform an adjustment of the safety device based on the occupant position and size category received form the occupant position monitor.

According to another aspect of the present invention, a method for determining proper seatbelt use by an occupant of a vehicle seat includes determining an extended length of a webbing of the seatbelt and assigning a size category of the occupant using information received from a position sensor within the vehicle. The method also includes accessing data from memory including a corresponding range of extended webbing lengths for the assigned size category and determining whether the extended length of the webbing is within the corresponding range.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
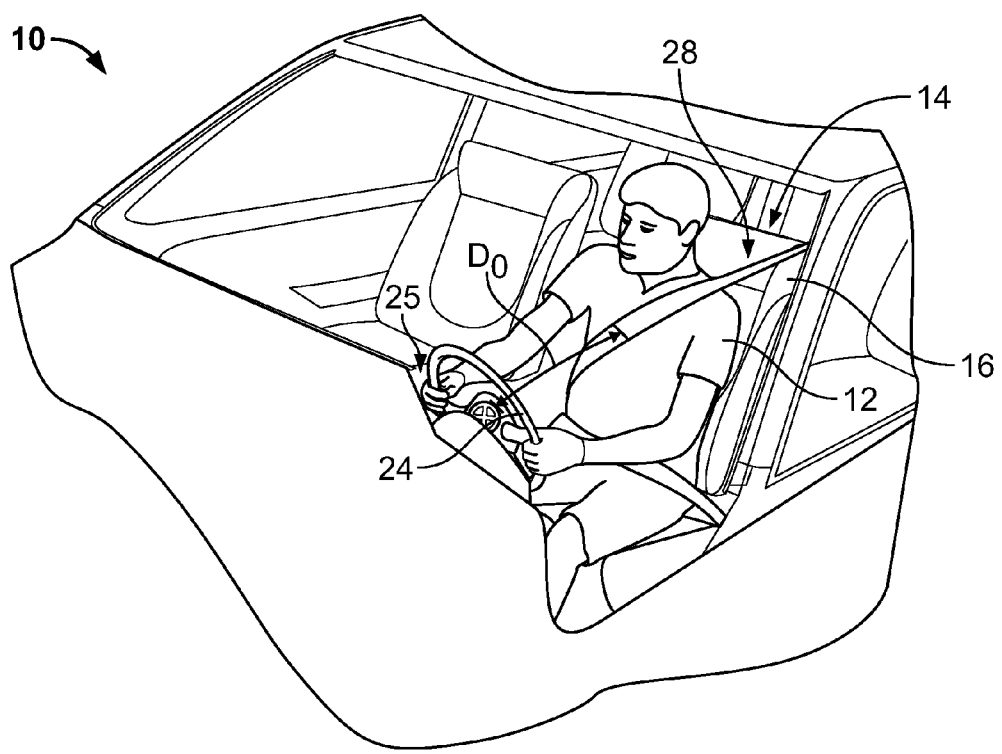
FIG. 1 shows a portion of a vehicle including a vehicle seat with which a monitoring system according to one embodiment can be associated.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations.

Referring now to FIG. 1, reference numeral 10 generally designates a motor vehicle, represented by a partial view of a generic interior thereof. An occupant 12 is shown positioned on a seat 14 of vehicle 10 and seatbelt 28 is in place over portions of the torso and lap of the occupant 12. As depicted, occupant 12 is a driver of vehicle 10 and is positioned accordingly, on the driver's side of the car behind steering wheel 24. As depicted, occupant 12 is positioned with his torso at a distance $D_O$ from the closest portion of the vehicle interior to the front of occupant 12, which as depicted is the steering wheel 24. Further, seatbelt 28 is depicted in an example of a proper seatbelt positioning, i.e. with portions of the seatbelt 28 positioned over the lap and shoulder/torso of the occupant 12 with neither portion positioned beneath or behind the occupant 12.

Figure 2:
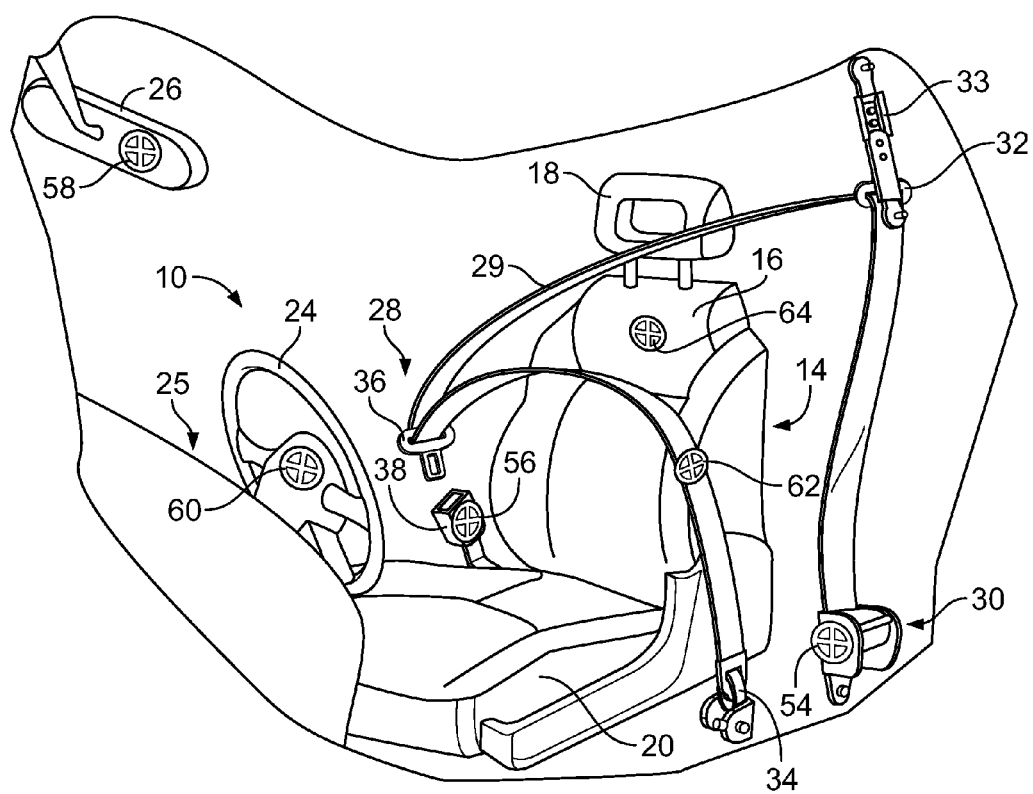
FIG. 2 shows a vehicle seat and additional vehicle components with elements of a monitoring system according to one embodiment.

As shown in FIG. 2, seat 14 (of which a generic representation of a vehicle seat is shown) generally includes a cushion 20 configured to support the lower body of the occupant 12 (not shown in FIG. 2). Cushion 20 is mounted by an appropriate structure not depicted herein to the frame or chassis of vehicle 10. Seatback 16 is coupled with cushion 20 and may be selectively adjustable in angle or the like with respect to cushion 20 by a variety of different mechanisms. As depicted, a headrest 18 can be fixedly or adjustably coupled with seatback 16, depending on the particular design thereof. Although a single-occupant seat (or a "driver's" or "captain's") chair is generally shown and is illustrated with corresponding structures to be positioned in the front driver's side of the vehicle 10, it is to be understood that the system described herein, along with the various associated components thereof, can be adapted to perform similar or identical operations for a single occupant seat in another location within vehicle 10 or for a multiple-occupant seat (e.g., a "bench" seat).

A restraint system generally including a seatbelt 28 is coupled with vehicle 10 and is configured to be used by an occupant 12 of seat 14. The restraint system depicted herein generically includes a number of components for positioning and securing the seatbelt 28 over the desired portions of the occupant 12. In particular, a retractor 30 is included either mounted directly with the frame or chassis of the vehicle by coupling with the floor or the base of the B-pillar, or with the seat by coupling with the seat frame (not shown). The positioning of retractor 30 shown in FIG. 2 is generally consistent with coupling to the base of the B-pillar, which is not depicted in FIG. 2. Retractor 30 includes a supply spool to which an end of the seatbelt 28 webbing 29 is coupled. As such, retractor 30 is configured to wind and permit to be unwound a portion of webbing 29 on the supply spool for desired retraction and extension of seatbelt 28. Refractor 30 may also be configured to lock extension of seatbelt 28 by inclusion of ratchet and/or clutch mechanisms operatively associated with the spool.

Positioner 32 is coupled with either the B-pillar of vehicle 10, with seat 14, or with another adjacent pillar (such as a C-pillar in the case or a rear or middle-row seat) and is located such that seatbelt 28 is directed from retractor 30 in a direction over the shoulder and chest of occupant 12. Positioner 32 can be movably coupled with vehicle 10 by a height adjuster 33 to provide for adjustment to the particular fit of seatbelt 28 by occupant 12. Seatbelt 28 is further fitted with a buckle insert 36 that is removably receivable within buckle receptacle 38 to secure seatbelt 28 in position over occupant 12. Buckle receptacle 38 is coupled with the chassis or frame of vehicle 10 or to seat 14 itself opposite retractor 30 and is positioned to maintain seatbelt 28 in position over both the torso of occupant 12 in cooperation with positioner 32 and over the lap of occupant 12 in cooperation with anchor 34. Anchor 34 is positioned on the same side of seat 14 as retractor 30 and has the remaining end of webbing 29 coupled therewith. Anchor 34 is either coupled with the frame or chassis of vehicle 10 in a location adjacent refractor 30 or can be coupled with a portion of seat 14 so as to secure the corresponding end of the seatbelt 28.

In one embodiment, vehicle 10 includes a monitoring system (depicted as system 50 schematically in the chart of FIG. 5 and with respect to the individual components thereof in the remaining Figures) to facilitate proper seatbelt usage in a manner similar to that which is depicted in FIG. 1. In particular, monitoring system 50 can be utilized with a vehicle control system 40 that can include one or both of a warning device and an ignition interlock system incorporated into vehicle 10. In an example, a vehicle control system 40 can be configured to display various visual warnings and/or audible tones in response to various conditions of which an occupant 12 should be aware. Such conditions include, low fuel, engine malfunction, and open doors or trunk, for example. When associated with monitoring system 50, the vehicle control system 40 (FIG. 5) can receive information from monitoring system 50 regarding improper use of seatbelt 28 for communication of an appropriate warning to occupant 12, which can include illumination of lighted indicators, presenting various audible tones, delivering text-based messages via a display on the instrument panel 25, playing a spoken message, or the like. Similarly, a vehicle ignition interlock can prevent engine ignition based on a number of criteria (e.g., vehicle not in "park," brake not depressed, etc.), which can be made to include an occupied seat (for example, the driver's seat) with a corresponding seatbelt in improper use. Accordingly, the combination of monitoring system 50 and vehicle control system 40 may be configured to encourage proper seatbelt usage by occupants of a vehicle's seats (typically the front seats, but also potentially include occupants of the rear seats).

Figure 5:
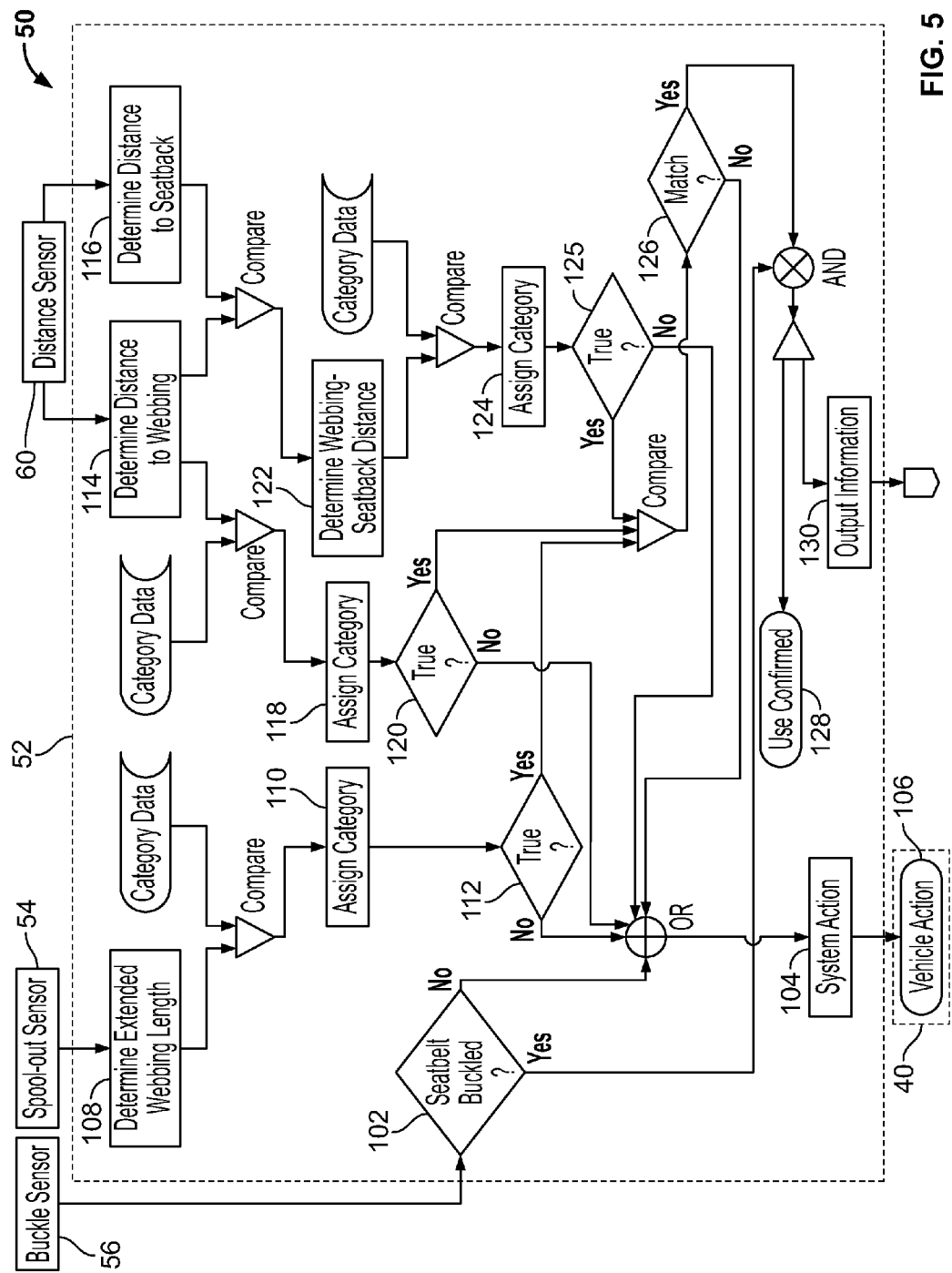
FIG. 5 is a flowchart illustrating a process that can be implemented by a monitoring system according to one embodiment.

The present monitoring system 50 utilizes a number of different components in communication with a central control unit 52 (FIG. 5). Control unit 52 may comprise a processor (such as a computer chip, application-specific integrated chip, or the like) and corresponding circuitry to facilitate coupling with a number of associated sensors within the vehicle and with additional vehicle components and systems, both which are described further below. In a further example, aspects of the control unit functionality, described herein, can be incorporated into an existing central computer system for vehicle 10. In such an instance, references to the control unit 52 and/or any programming thereof, would be understood to refer to aspects of such a computer system that are associated with or programmed to implement functionality of the described monitoring system 50. Monitoring system 50 is configured to detect that a particular monitored seat, such as seat 14, if occupied, has the associated seatbelt both buckled and in proper use by occupant 12.

In an embodiment, monitoring system 50 includes a switch or other sensor within buckle receptacle 38. Such a buckle sensor 56 can be configured to output a signal when buckle insert 36 is securely received within buckle receptacle 38, for example. System 50 may further include spool-out sensor 54 operatively coupled with retractor 30. Spool out sensor 54 is configured to detect or measure a length of webbing 29 extended from retractor 30. In an example this can be done by configuring spool-out sensor 54 to be able to detect and measure rotation of the spool within retractor 30 around which webbing 29 is wound. As such, spool out sensor 54 can be an optical sensor capable of detecting revolutions of spool based on optical markers thereon. Alternatively, spool out sensor 54 can be magnetic or electro-mechanical and can be coupled with the spool of retractor 30 to measure revolutions or other rotation thereof. By calibrating spool-out sensor 54 with the length of webbing 29 when seatbelt is in an initial state (seatbelt 28, in FIG. 3) and, optionally, with the thickness of webbing 29, spool out sensor 54 itself or the control unit 52 can calculate an amount of webbing 29 extended from retractor 30 (and further a resulting overall length of retracted webbing 29) based on the revolutions (and/or partial revolutions) of the spool of retractor 30.

Figure 3:
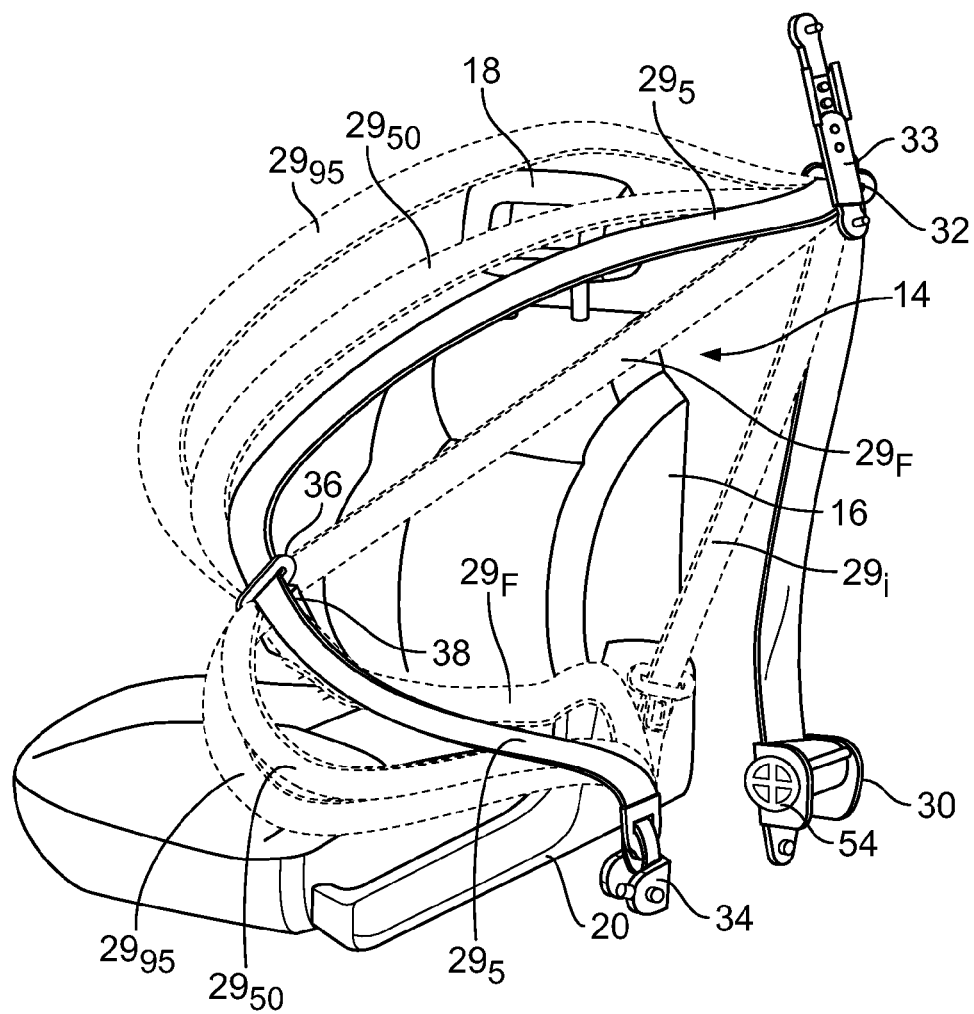
FIG. 3 shows the vehicle seat of FIG. 2 with an associated seatbelt webbing in various positions, as monitored using the monitoring system elements of FIG. 2.

As shown in FIG. 3, when extended over an occupant 12 of seat 14, the extended webbing 29 length of seatbelt 28 can vary with the size of the particular occupant. This variation can be due to the different size lengths of webbing 29 that must be extended from retractor 30 to reach over the torso of occupant 12 between positioner 32 and the secured buckle insert 36, as well as over the lap of occupant 12 between secured buckle insert 36 and anchor 34, which take the form of arcs or loops of webbing 29 of a length commensurate with the size of the portions of occupant 12 over which such arcs extend. The required lengths of these arcs or loops of webbing 29 add up to an overall length of webbing 29 that must be extended from retractor 30 in addition to the length of webbing already present in the unbuckled default position of webbing 29, to secure seatbelt 28 over an occupant 12 of a particular size or within a particular size range. In the example shown, various extended lengths of webbing 29 are depicted that may generally correspond with an occupant in the fifth percentile of size (webbing $29_5$), in the $50^{th}$ percentile of size (webbing $29_{50}$), and in the $95^{th}$ percentile of size (webbing $29_{95}$). Such size demarcations may be utilized by system 50 in determining proper seatbelt usage, although other scales of measurement at different resolutions may be used by system 50.

As discussed above, spool-out sensor 54 measures a length of webbing 28 withdrawn from retractor 30. Accordingly, spool-out sensor 54 can be used in a determination by system 50 if a sufficient length of webbing 29 has been extended from retractor 30 to correspond with a proper seatbelt 28 use mode, as discussed in further detail below.

Returning to FIG. 2, vehicle 10 can also include one or more additional sensors that can be utilized by monitoring system 50 in conjunction with spool-out sensor 54. In the example shown, a driver position sensor 60 can be included in steering wheel 24, as shown in FIG. 2. Driver position sensor 60 can alternatively be included in or on a portion of the instrument panel 25 (shown in FIG. 1) proximate the driver's seat. Driver position sensor 60 can be configured to locate and sense a position of one or more features, which can be used to measure distances between the location of the sensor 60 and other components of the interior of vehicle 10, which can be input to system 50. Various forms of sensors can be used for driver position sensor 60, including for example electro-optical proximity detector ("EOPD") sensors, which may include an LED light source and a detector to measure light reflected back toward the LED, from which a distance between the LED source and the object reflecting the light back toward the LED can be determined. A proximity sensor, which is a type of sensor that can detect the presence of nearby objects without physical contact, can also be used for driver position sensor 60, as can global positioning system ("GPS") components. Additionally, various types of non-contact type displacement fast response sensors can be used for driver position sensor 60. Sensors of such a type can measure the distance between the sensor and another object using a magnetic field, a laser beam, ultrasonic waves or the like.

As also shown in FIG. 2, an auxiliary position sensor 58 can also be included and can be coupled with rearview mirror 26, as shown, or with another feature of the interior of vehicle 10 (such as a vehicle headliner, a ceiling console, the like). Auxiliary position sensor 58 can be of any of the types discussed above with respect to driver position sensor 60 and, in an example, can be of the same type of sensor used for driver position sensor 60 in connection with a given monitoring system 50. Additional auxiliary position sensors can be included proximate the passenger seat (such as coupled with the vehicle dashboard) or the rear vehicle seats (such as coupled with the headrest 18 of a corresponding front seat).

Figure 4:
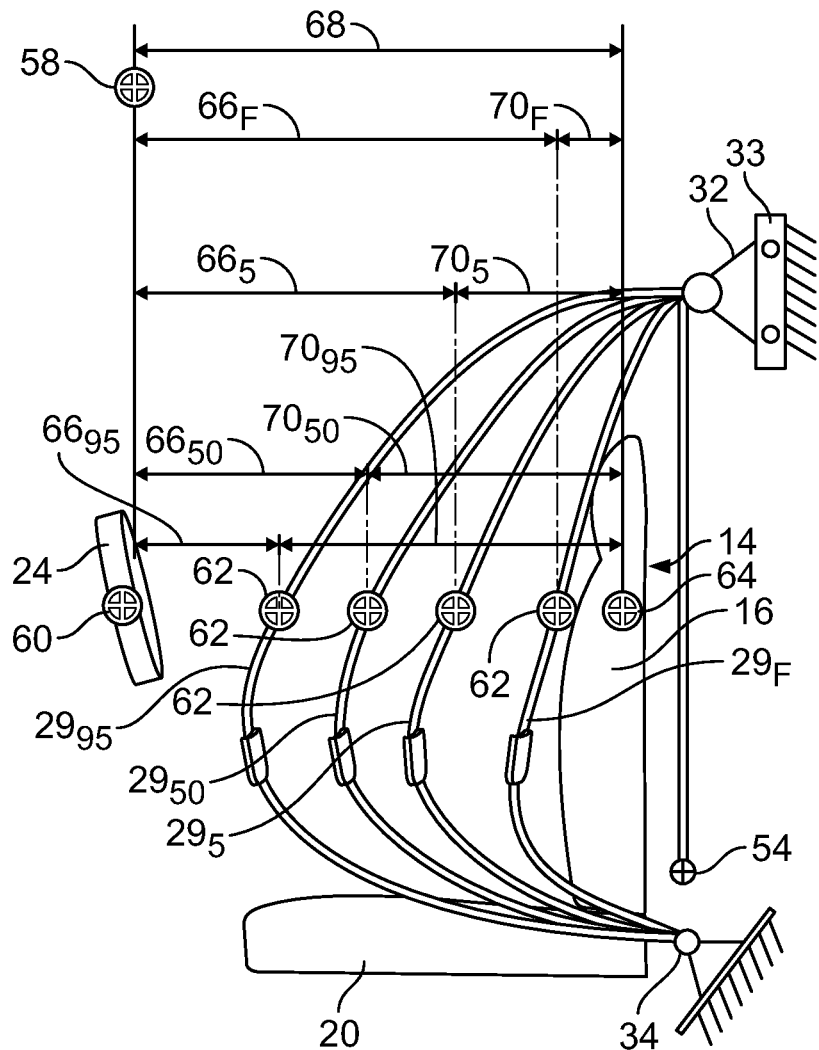
FIG. 4 is a schematic depiction of various distances between monitoring elements, which can be determined using a monitoring system according to one embodiment.

As shown in FIG. 4, driver position sensor 60 can be used to measure the distance between steering wheel 24 and both the seatbelt webbing 29 and the seatback 16. Similarly, auxiliary position sensor 58 can be used to measure the distance between rearview mirror 26, for example, and both the seatbelt webbing 29 and the seatback 16. Depending on the particular type of sensor, including the example sensors discussed above, various types of markers may be used in connection with both webbing 29 and seatback 16 that can be identified by sensors 58 and 60 and/or that can provide any reflective qualities (i.e. light, sound, etc.) that may be needed for sensor operation. For example, some types of EOPD sensors, as described above, require light above a predetermined threshold to be reflected back to the sensor after originating from the associated light source. In connection with such a sensor, marker 62, depicted schematically on webbing 29 and/or marker 64, depicted schematically on seatback 16, can be of a retroreflective material or construction. In some embodiments, such markers 62 and 64 can be discrete elements affixed with webbing 29 and seatback 16, respectively. The particular size and construction of such markers 62 and 64 can vary with the particular way with which they are affixed to the respective structures and the particular EOPD sensor used. When such a discrete marker 62 is used in connection with webbing 29, for example, it may be in a fixed location along webbing 29. In such an instance, driver position sensor 60 and/or auxiliary position sensor 58 can further determine the distance 66 to webbing 29 by compensating for the varying location of marker 62, e.g., between insert 36 and positioner 32 or between insert 36 and anchor 34, that can further relate to the size of occupant 12. Markers 62 and 64 can also have different characteristics therebetween (color, pattern, size, shape, etc.) so that sensors 58 and 60 can distinguish between the two markers 62 and 64.

Markers 62 and 64 may, alternatively, be integrated with their corresponding features. For example, a stripe of retroreflective material can be present on seatbelt webbing 29, such as by weaving in a retroreflective thread directly into a portion of webbing 29 or by addition of a retroreflective stripe on a surface of webbing 29 by printing, a transfer process, or the like. Similarly, a pattern of retroreflective elements can be printed onto or woven with the material of seatback 16, for example. Other types of sensors using light may require markers of such a type, and other sensors that operate by reflection may also need markers similarly configured with the appropriate reflective properties. Similarly, in an example where sensors 58 and 60 are of a magnetic-field based proximity sensor type, materials having magnetic properties can be used as markers and can be coupled with or otherwise integrated with webbing 29 and seatback 16.

In another variation, a sensor type can be used for sensors 58 and 60 that can allow for existing characteristics of webbing 29 and seatback 16 to function as markers. For example, an ultrasonic proximity sensor can be tuned or calibrated to identify and distinguish between the material of seatback 16 and webbing 29 based on the alteration profile of ultrasonic waves reflected thereby. A sensor incorporating lasers or other types of light (visible, UV, infrared, etc.) can be calibrated or programmed to operate in a similar manner, as can video-based sensors, which may also be used for sensors 58 and 60.

As mentioned above, control unit 52 is in communication with each of the sensors, including spool out sensor 54, buckle sensor 56, auxiliary position sensor 58, and driver position sensor 60 and can use information received therefrom to monitor for proper use of seatbelt 28 and to cause various actions to be taken in response to any detected improper usage. FIG. 5 is an example of a flowchart showing the various inputs received by control unit 52 and example logic that can be implemented thereby to determine if one of the seatbelts 28 of vehicle 10 is in proper use by occupant 12, both in an embodiment of monitoring system 50 itself and in a method that can be used to monitor use of seatbelt 28 according to another embodiment. The flowchart shown can be adapted and scaled to monitor for proper usage of additional seatbelts within vehicle 10 by other occupants, and the overall scheme represented thereby can be implemented according to other variations in the precise logic to achieve similar results.

As shown in FIG. 5, control unit 52 is electrically coupled with buckle sensor 56, the operation of which is discussed above with respect to FIGS. 1 and 2, so as to be able to receive an input therefrom. The input from buckle sensor 56 allows control unit 52 to determine if the seatbelt 28 is buckled (i.e. that buckle insert 36 is secured within buckle receptacle 38) in step 102. If it is determined that seatbelt 28 is not buckled or not in use, control unit 52 can signal for vehicle 10 to take a predetermined action (step 104). In an example, the control unit 52 can output from system 50 a signal to vehicle control system 40, which can include for example an onboard computer system of vehicle 10 in communication with other systems therein. Such an output in step 104 can direct control system 40 to, for example, display a visual indication for the user to buckle or otherwise properly use seatbelt 28, which can further be done in connection with the presentation of an audible tone. Additionally or alternatively, such an output can direct or be interpreted by control system 40 to deactivate the ignition of vehicle 10, which can prevent vehicle 10 from starting. In a variation, vehicle control system 40 can prevent vehicle 10 from being shifted out of park or other such actions in response to an output in step 104.

If control unit 52 determines that seatbelt 28 is buckled in step 102, control unit 52 may then continue to monitor input(s) from the additional sensors 54 and 60 to check that the conditions monitored thereby are consistent with proper use of the buckled seatbelt 28. It is noted that, while driver position sensor 60 is shown in the example of system 50 shown in FIG. 5, auxiliary position sensor 58 can be used in place of or in addition to driver position sensor 60. As shown, control unit 52 may receive information from spool-out sensor 54 to determine a length of webbing 29 extended from retractor 30 beyond that withdrawn in the initial position $29_i$, as discussed above with respect to FIGS. 2 and 3. This length, as determined in step 108 can then be compared to data within system 50 regarding known lengths of withdrawn webbing 29 that correspond to ranges or particular occupant sizes. This comparison may then be used to assign a category value that corresponds to a determined approximate size range of occupant 12 based on the withdrawn length of webbing 29 (e.g., $29_5$, $29_{50}$, or $29_{95}$, as depicted in FIG. 3, or based on other categorizations or resolutions).

As previously noted, it may be possible for an occupant 12 to buckle seatbelt 28 prior to positioning himself within seat 14. Occupant 12 can then sit on webbing 29 of buckled seatbelt 28 to "trick" a system having only a buckle sensor 56. To monitor for such improper use, the data within system 50 can include category information related to the length of webbing 29 withdrawn in such a buckled, but improperly used state, shown as webbing $29_F$ in FIG. 3. Such a length of webbing $29_F$ can be, for example, a length of withdrawn webbing 29 that is below the range for the smallest predetermined approximate occupant size category. Webbing $29_F$ of such a length can be classified along with the occupant size classifications and can be assigned in step 110 as a "false" category value when, for example, none of the other category values for webbing 29 is applicable. As shown in step 112, control unit 52 can then determine if a false category value is associated with the length of webbing 29 and, if so, can take a predetermined action in step 104, as discussed above to notify the user that improper usage of seatbelt 28 has been determined and/or to disable particular vehicle 10 actions until proper usage is achieved.

Control unit 52 can also use information received from driver position sensor 60 (and/or auxiliary position sensor 58) to confirm a proper seatbelt use indication, should one be found, in step 112 above. Even with the above-described monitoring of spool-out sensor 54, opportunities still exist for occupant 12 to improperly use seatbelt 28. For example, occupant 12 can extend an additional amount of webbing 29 in a buckled but unused state, as discussed above, to give a false true reading based on the length of webbing 29. Further, occupant 12 may be able to buckle seatbelt 28 with a portion of webbing 29 behind, instead of over, her torso, while still having enough webbing 29 extended to achieve a true value for the webbing length. It is noted that in such an example, the wrong size category may be assigned as a result of such improper use, and as such, an occupant 12 who is large (e.g., in the $95^{th}$ percentile of size) may be able to obtain a true spool-out reading (e.g., corresponding to the $50^{th}$ or $5^{th}$ percentile) by such improper use. To limit the ability of occupant 12 to manipulate monitoring system 50 according to one or more of the uses discusses above, control unit 52 can measure both the distance between steering wheel 24, for example, and webbing 29, as well as the distance between steering wheel 24 and seatback 16, as shown in steps 114 and 116, respectively, of FIG. 5.

The distance 66 between steering wheel 24 and webbing 29 can then be compared with stored data relating to predetermined webbing positions for occupants of varying sizes to assign a category value for distance 66 relating, again, to the size of the user, as determined by driver position sensor 60. For example, the categories and resolution of the value for distance 66 can correspond to those for the length of webbing 29. As shown in FIG. 4, this categorization can include sizes corresponding to an occupant in the 5$^{th}$ percentile (distance $66_5$), the 50$^{th}$ percentile ($66_{50}$), and the 95$^{th}$ percentile ($66_{95}$). Additionally, control unit 52 can also determine a false reading for distance $66_F$ that corresponds to improper seatbelt 28 usage (step 120). Such a false reading for distance $66_F$ can include an inability to locate webbing 29 (or marker 62), which can result from the occupant 12 being positioned over webbing 29, for example, or a distance $66_F$ that is too far from steering wheel 24 for seatbelt 28 to be otherwise properly used. If such a false reading is determined, the control unit 52 takes appropriate action (step 104), as discussed above. If a true reading is given, the category value for distance 66 is noted or otherwise stored in memory.

By subtracting distance 66 from the distance 68 from the steering wheel 24 to the seatback 16, the distance 70 from the webbing 29 to the seatback 16 can be determined (step 116 in FIG. 5). As with distance 66, distance 70 between webbing 29 and seatback 16 can then be compared with stored data relating to predetermined seatback-to-webbing distances for occupants of varying sizes to assign an additional category value to distance 70, relating to the size of the user, as determined in step 122. For example, the categories and resolution of the value for distance 70 can correspond to those for the length of webbing 29 and distance 66. As shown in FIG. 4, this categorization can include sizes corresponding to an occupant in the 5$^{th}$ percentile (distance $70_5$), the 50$^{th}$ percentile ($70_{50}$), and the 95$^{th}$ percentile ($70_{95}$). Additionally, control unit 52 can also determine a false reading for distance $70_F$ that corresponds to improper seatbelt 28 usage (step 125). Such a false reading for distance $70_F$ can be zero or otherwise sufficiently small to indicate that the seatbelt 28, while buckled is not properly worn, for example that all or a part of webbing 29 is between occupant 12 and seat 14. If such a false reading is determined, the control unit takes appropriate action (step 104), as discussed above. If a true reading is given, the category value for distance 70 is noted or otherwise stored in memory.

If each of the assigned values for extended webbing length 29, distance 66, and distance 70 are determined to be true readings, the values are compared in step 126. If such a comparison indicates that the particular categories of the size of occupant 12 are the same (e.g., all correspond to a user in the 50$^{th}$ percentile of size), then proper usage of a buckled seatbelt 28 is, thus, confirmed by control unit 52 (step 128). If such a result is obtained, then no warning images or audible tones are generated by system 50 to be outputted by vehicle control system 40, which then continues to monitor for a change in the status of any or the readings such that an individual false reading is made or such that the category values no longer match. If the categories do not match, improper usage of seatbelt 28 is inferred by system 50. Such improper usage can be any in which seatbelt 28 is buckled, but is not in proper use by occupant 12, which can include for example, any use where the webbing 29 is not appropriately positioned over occupant 12, but is manipulated to avoid one of the above-described false readings. In an example, such improper usage can include a seatbelt 28 in use with webbing 29 positioned over occupant 12 but clipped or otherwise secured out of position over the lap of occupant 12, which could result in a higher category value for webbing 29 than for distances 66 and 70. Other similar improper usage modes could be detected by this and other non-matching value patterns.

Figure 6:
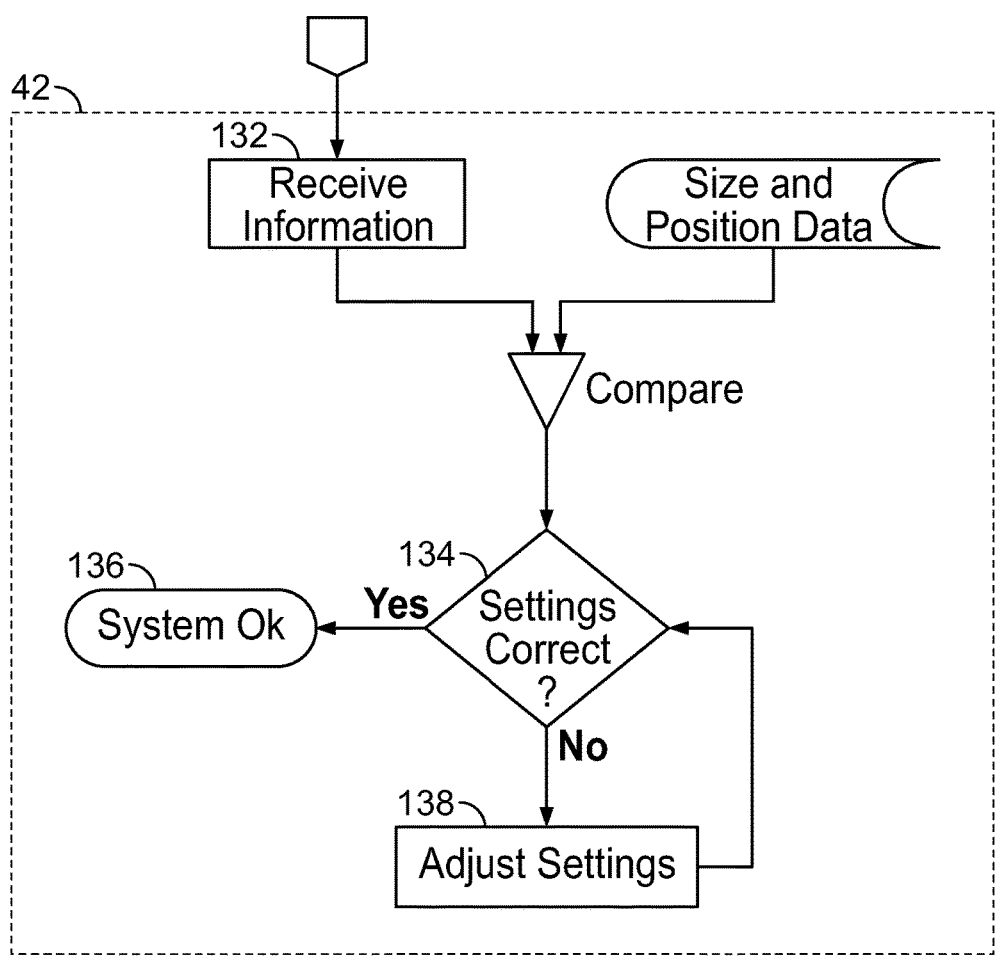
FIG. 6 is a continuation of the flowchart of FIG. 5 illustrating additional process steps that can be carried out by a vehicle associated with the monitoring system of FIG. 5.

As indicated by step 130 in FIG. 5, control unit 52 can output the information received from spool-out sensor 54, driver position sensor 60, and/or auxiliary position sensor 58, as well as the size or value category information determined by control unit 52 for use by another component or system of vehicle 10. In the example shown in FIG. 6, such output from control unit 52 in step 130 can be received by vehicle safety system 42, which can be, for example, an airbag or other supplemental restraint system ("SRS"). Examples of such safety systems have specific variable use or deployment characteristics, such as deployment speed or inflation pressure for example, and some systems may be configured to adjust such characteristics based on a number of different criteria, which can include occupant size and position. Accordingly, safety system 42 can receive the size and position information for occupant 12 from system 50 in step 132, which can correspond to a calculated estimate of the user's size and of the distance $D_O$ between, for example, the occupant 12 and the steering wheel 24. In the example shown, safety system 42 can then compare the received data with stored information related to any available modes of adjustment and corresponding criteria related to occupant 12 position and/or size. Such a comparison can be made to determine if current settings for safety system 42 are correct in step 134. If adjustment is needed, it can be made in step 138 until the desired settings are achieved, at which point, the action ends, pending a change in the input information (step 132). Other safety systems can be adjusted in similar ways using the output from system 50. In an embodiment, vehicle safety system 42 can include a dedicated processor to implement the functionality thereof, including for example, receiving and interpreting the size and position information from system 50 and/or adjusting the settings thereof. In another example, such functionality can be carried out by the central computer system of vehicle 10, described above.

As mentioned above, the above-described control unit 52 and the corresponding process implemented thereby for determining proper seatbelt usage can be adapted to include additional sensors to achieve different modes of use verification according to the components they monitor and the positioning desired for the components and/or the location of such sensors. For example, control unit 52 can be configured to monitor multiple seats using multiple sensors, or to use additional sensors to monitor any given seat, such as seat 14 monitored in the flowchart of FIG. 5. In one example, an embodiment of the above-described system 50 can receive data from a weight sensor (not shown) coupled with seat 14, such as with cushion 20, to determine the weight of occupant 12. Such weight can be categorized by control unit 52 for comparison with the other size category values to offer additional or alternative size verification to correspond with the monitored use modes.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A monitoring system for a vehicle including a seat and a restraint including seatbelt webbing, comprising:
    a webbing length sensor coupled with the restraint;
    a position sensor; and
    a processor in communication with the webbing length sensor and the position sensor and programmed to:
        compare data from the webbing length sensor to first data correlating various webbing lengths to at least four occupant size categories to assign one of the four occupant size categories to the data from the webbing length sensor;
        compare data from the position sensor to second data correlating various positions to the at least four occupant size categories to assign one of the four occupant size categories to the data from the position sensor; and
        determine an improper seatbelt use when the data from the webbing length sensor and the data from the position sensor have different occupant size categories assigned thereto and output a corresponding signal.

2. The monitoring system of claim 1, wherein the webbing length sensor is a spool-out sensor coupled with a supply spool for the seatbelt webbing of the vehicle restraint, and wherein the data from the webbing length sensor is based on an extended webbing length using information from the spool-out sensor.

3. The monitoring system of claim 1, wherein the processor is further programmed to:
    determine a webbing position using the position sensor;
    assign the occupant size category based on a comparison of the determined webbing position and a set of the four occupant size categories corresponding to predetermined webbing positions; and
    assign a webbing length category based on a comparison of the extended webbing length and a set of webbing length categories corresponding to predetermined extended webbing lengths.

4. The monitoring system of claim 1, wherein the signal output by the processor is a warning signal relating to the improper seatbelt use by an occupant.

5. The monitoring system of claim 1, wherein the signal output by the processor directs a vehicle control system to disable an ignition of the vehicle engine.

6. The monitoring system of claim 1, further including a buckle sensor coupled with a buckle mechanism of the restraint, and wherein the processor is further programmed to output the signal further based on a determination that the restraint is in a buckled state using information received from the buckle sensor.

7. The monitoring system of claim 1, further including an occupant weight sensor coupled with the seat, and wherein the processor is further programmed to determine an occupant weight using the occupant weight sensor and to confirm the occupant size category assigned to at least one of the data from the webbing length sensor and the data from the position sensor based on a comparison with the determined occupant weight.

8. The monitoring system of claim 1, further including a first marker associated with the seatbelt, and wherein the data from the position sensor includes a sensed position of the first marker by the position sensor.

9. The monitoring system of claim 8, wherein the first marker is the seatbelt webbing.

10. The monitoring system of claim 8, further including a second marker associated with the vehicle seat, wherein the data from the position sensor further includes a sensed position of the second marker.

11. The monitoring system of claim 10, wherein the processor is further configured to output information related to the sensed positions of the first and second markers to a safety system within the vehicle.

12. A vehicle, comprising:
    a restraint including a seatbelt webbing and a first marker associated with the webbing;
    at least one adjustable safety device;
    a position sensor;
    a webbing length sensor coupled with the restraint;

an occupant position monitor in communication with the position sensor; and a control system in communication with the occupant position monitor, the position sensor, and programmed to:

compare data from the webbing length sensor to first data correlating various webbing lengths to at least four occupant size categories to assign one of the four occupant size categories to the data from the webbing length sensor;

compare data from the position sensor to second data correlating various position to the at least four occupant size categories to assign one of the four occupant size categories to the data from the position sensor; and determine an improper seatbelt use when the data from the webbing length sensor and the data from the position sensor have different occupant size categories assigned thereto and output a corresponding signal; and perform an adjustment of the safety device based on a monitored occupant position and one of the four occupant size categories to the data from the position sensor.

13. The vehicle of claim 12, wherein the adjustable safety device is an airbag system having a variable deployment characteristic, and wherein the control system is programmed to perform the adjustment of the variable deployment characteristic of the airbag system based on at least one of the occupant position and the occupant size category.

14. The vehicle of claim 12, further including:
a seat; and
a second marker associated with the seat;
wherein the processor is further programmed to assign the occupant size category and to determine the occupant position using a sensed position of the second marker.

15. A method for determining proper seatbelt use by an occupant of a vehicle seat, comprising:
determining an extended length of a webbing of the seatbelt;
assigning one of four size categories of the occupant using information received from a position sensor within the vehicle;
accessing data from memory including a corresponding range of extended webbing lengths for the assigned one of the four size categories; and
determining an improper seatbelt use when the extended length of the webbing is outside the corresponding range.

16. The method of claim 15, further including outputting an improper use signal if the extended length of the webbing is outside the corresponding range.

17. The method of claim 15, wherein:
the data including the corresponding range of extended webbing lengths is in the form of webbing length categories;
the method further includes assigning a webbing length category based on the determined extended length of webbing; and
determining whether the extended length of the webbing is within the corresponding range includes comparing the assigned webbing length category with the assigned one of the four size categories.

18. The method of claim 15, wherein the occupant size category is assigned by measuring a distance to a first marker associated with the seatbelt using the position sensor and by comparing the measured distance to the first marker with a set of stored data relating to the four occupant size categories.

19. The method of claim 18, further including:
sensing a position of a second marker associated with the vehicle seat;
determining a distance between the first marker and the second marker; and
confirming the occupant size category based on corresponding ranges of values for the distance between the first marker and the second marker.

20. The method of claim 18, further including determining the improper seatbelt use if a position of the second marker cannot be determined.

* * * * *